United States Patent [19]

Micali

[11] Patent Number: 5,960,083
[45] Date of Patent: *Sep. 28, 1999

[54] CERTIFICATE REVOCATION SYSTEM

[76] Inventor: Silvio Micali, 459 Chestnut Hill Ave., Brookline, Mass. 02146

[ * ] Notice: This patent is subject to a terminal disclaimer.

[21] Appl. No.: 08/823,354

[22] Filed: Mar. 24, 1997

Related U.S. Application Data

[63] Continuation of application No. 08/559,533, Nov. 16, 1995, Pat. No. 5,666,416
[60] Provisional application No. 60/006,038, Oct. 24, 1995.

[51] Int. Cl.$^6$ ............... H04L 9/32; H04L 9/30; H04L 9/00
[52] U.S. Cl. ............... 380/23; 380/25; 380/30; 380/49
[58] Field of Search ............... 380/9, 21, 23, 380/25, 29, 30, 49, 50

[56] References Cited

U.S. PATENT DOCUMENTS

| | | |
|---|---|---|
| Re. 34,954 | 5/1995 | Haber et al. . |
| 4,200,770 | 4/1980 | Hellman et al. . |
| 4,218,582 | 8/1980 | Hellman et al. . |
| 4,309,569 | 1/1982 | Merkle . |
| 4,326,098 | 4/1982 | Bouricius et al. . |
| 4,881,264 | 11/1989 | Merkle ........................ 380/25 |
| 4,926,480 | 5/1990 | Chaum ........................ 380/23 |
| 4,943,707 | 7/1990 | Boggan . |
| 5,003,597 | 3/1991 | Merkle ........................ 380/37 |
| 5,005,200 | 4/1991 | Fischer ........................ 380/30 |
| 5,016,274 | 5/1991 | Micali et al. ................. 380/23 |
| 5,136,646 | 8/1992 | Haber et al. . |
| 5,136,647 | 8/1992 | Haber et al. . |
| 5,157,726 | 10/1992 | Merkle et al. ............... 380/23 |
| 5,231,666 | 7/1993 | Matyas ........................ 380/25 |
| 5,261,002 | 11/1993 | Perlman et al. ............. 380/30 |
| 5,315,657 | 5/1994 | Abadi et al. ................. 380/25 |
| 5,340,969 | 8/1994 | Cox . |
| 5,396,624 | 3/1995 | Campbell, Jr. . |
| 5,420,927 | 5/1995 | Micali ........................ 380/23 |
| 5,432,852 | 7/1995 | Leighton et al. ............ 380/30 |
| 5,434,919 | 7/1995 | Chaum . |
| 5,450,493 | 9/1995 | Maher ........................ 380/30 |
| 5,497,422 | 3/1996 | Tysen et al. . |
| 5,537,475 | 7/1996 | Micali ........................ 380/30 |
| 5,544,322 | 8/1996 | Cheng et al. . |
| 5,606,617 | 2/1997 | Brands et al. .............. 380/30 |
| 5,615,268 | 3/1997 | Bisbee et al. . |
| 5,659,616 | 8/1997 | Sudia ........................ 380/23 |
| 5,666,416 | 9/1997 | Micali ........................ 380/23 |
| 5,677,955 | 10/1997 | Doggett et al. ............. 380/24 |
| 5,687,235 | 11/1997 | Perlman et al. ............ 380/25 |
| 5,699,431 | 12/1997 | Van Oorschot et al. ..... 380/30 |
| 5,717,757 | 2/1998 | Micali ........................ 380/25 |
| 5,717,758 | 2/1998 | Micali ........................ 380/25 |
| 5,748,738 | 5/1998 | Bisbee et al. ............... 380/25 |
| 5,774,552 | 6/1998 | Grimmer . |

OTHER PUBLICATIONS

Applied Cryptography by Bruce Schneier, 2nd edition, pp. 573–577, Oct. 1995.

CygnaCom Solutions, Inc., "Federal Public Key Infrastructure (PKI) Technical Specifications Part D —Interoperability Profiles," Published on the World Wide Web, Sep. 27, 1995, 91 pages.

(List continued on next page.)

*Primary Examiner*—Bernarr Earl Gregory
*Attorney, Agent, or Firm*—Foley, Hoag & Eliot LLP

[57] ABSTRACT

A method of managing certificates in a communication system having a certifying authority and a directory. Preferably, the method begins by having the certifying authority generate certificates by digitally signing a given piece of data. At a later point time, the certifying authority may produce a string that proves whether a particular certificate is currently valid without also proving the validity of at least some other certificates. The technique obviates use of certification revocation lists communicated between the certifying authority and the directory.

15 Claims, 1 Drawing Sheet

OTHER PUBLICATIONS

Nazario, N., "Federal Public Key Infrastructure (PKI) Version 1 Technical Specifications: Part B —Technical Security Policy," Published on the World Wide Web, Mar. 13, 1996, 20 pages.

Polk, W., editor, "Federal Public Key Infrastructure (PKI) Technical Specifications (Version 1) Part A: Requirements," Published on the World Wide Web, Dec. 6, 1996, 18 pages.

Ford, Warwick, "A Public Key Infrastructure for U.S. Government Unclassified but Sensitive Operations," Published on the World Wide Web, Sep. 1, 1995, 93 pages.

Chokhani, Santosh, et al., "Certificate Policy and Certification Practice Statement Framework", Published on World Wide Web, Nov. 3, 1996.

Polk, William T., "Minimum Interoperability Specifications for PKI Components," Published on the World Wide Web, Nov., 1996.

Chokhani, Santosh, "Security Considerations in Using X. 509 Certificates," Published on the World Wide Web.

Dodson, Donna F., "NIST PKI Implementation Projects," Published on the World Wide Web.

Burr, William, "A Proposed Federal PKI Using X. 509 V3 Certificates: The NISSC Presentation," Published on the World Wide Web.

Farrell, S., et al., "Internet Public Key Infrastructure Part III: Certificate Management Protocols," Published on the World Wide Web, Dec. 1996, 83 printed pages.

Nazario, Noel et al., "Management Model for the Federal Public Key Infrastructure," Published on the World Wide Web, Oct. 24, 1996.

Nazario, Noel A., "Security Policies for the Federal Public Key Infrastructure," Published on the World Wide Web, Oct. 24, 1996.

Burr, William, et al., "MISPC: Minimum Interoperability Specifications for PKI Components," Published on the World Wide Web, Dec. 2, 1996.

Rivest, R.L., et al., "A Method for Obtaining Digital Signatures and Public–Key Cryptosystems", *Communications of the ACM,* 120–126 (Feb. 1978).

Lamport, L., "Password Authentication with Insecure Communication", *Communications of the ACM,* 770–772 (Nov. 1981).

Linn, J., IAB Privacy Task Force, Request for Comments No. 1113, "Privacy Enhancement for Internet Electronic Mail: Part I —Message Encipherment and Authentication Procedures" 1–30 (Aug. 1989).

Kent, S., et al., IAB Privacy Task Force, Request for Comments No. 114, "Privacy Enhancement for Internet Electronic Mail: Part II—Certificate–Based Key Management", 1–22 (Aug. 1989).

"Public Key Infrastructure Study —Final Report", *National Institute of Standards and Technology* (Apr. 1994).

International Standard ISO/IEC 9594–8, "Information technology — Open Systems Interconnection —The Directory: Authentication framework", *ISO/IEC,* second edition, Sep. 15, 1995.

Rivest, R. L., et al., "PayWord and MicroMint: Two simple micropayment schemes", *MIT Laboratory for Computer Science/Weizmann Institute of Science,* 11 pgs. (Nov. 1995).

Housley, R., et al., "Internet Public Key Infrastructure Part I: X.509 Certificate and CRL Profile", Published on the World Wide Web, 1–30 (Jun. 1996).

Farrell, S., et al., "Internet Public Key Infrastructure Part III: Certificate Management Protocols", Published on the World Wide Web, 1–36 (Jun. 1996).

"Final Text of Draft Amendments DAM 4 to ISO/IEC 9594–2, DAM 2 to ISO/ICE 9594–6, DAM 1 to ISO/IEC 9594–7, and DAM 1 to ISO/IEC 9594–8 on Certificate Extensions", 41 pages (Jun. 30, 1996).

ANSI X9.55–1955 "Public Key Cryptography for the Financial Services Industry: Extensions to Public Key Certificates and Certificate Revocation Lists" (working draft) 37 pages (Jul. 3, 1996).

ANSI X9.57–199x Public Key: Crytography for the Financial Services Industry: Certificate Management© (working draft) 86 pages (Jun. 21, 1996).

Bellare M., et al., "Incremental Crytography: The Case of Hashing and Signing" *Proceedings of Crypto '95* 216–233 (1995).

Micali, S., "Computationally–Sound Proofs", *MIT Laboratory for Computer Science,* 55 pages, Apr. 11, 1995.

Micali, S. et al., Abstract entitled "An Efficient Zero–Knowledge Method for Answering Is He In Or Out? Questions" presented by M. Rabin at the National Computer Science Institute In Berkeley, CA (Dec. 1995).

"Escrowed Encryption Standard (EES)", Federal Information Processing Standards Publication 185, Feb. 9, 1994, 7 pps.

Micali, S., "Enhanced Certificate Revocation System", MIT Laboratory for Computer Science, 9 pages, Nov. 1995.

Chaum, D., "Untraceable Electronic Mail Return Addressess and Digital Pseudonyms," *Communications of the ACM,* vol. 24, No. 2, pp. 84–88, Feb. 1981.

Gennaro et al., "Robert Threshold DSS Signatures," *Euro-Crypt 96* .

Harn, "Group–Oriented (t,n) threshold digital signature scheme and digital multisignature," *IEEE Proc. –Comput. Digit. Tech.,* Sep. 1994.

Rivest, Ronald L., et al., "SDSI–A Simple Distributed Security Infrastructure," Sep. 15, 1996, Published on the World Wide Web, 50 pages.

Facsimile message from Chini Krishnan of Integris Security, Inc. to Professor Silvio Micali, dated Feb. 17, 1997, 7 pages including cover sheet, submitted in attached sealed envelope as Proprietary Material Not Open To Public To Be Opened Only By Examiner Or Other Authorized Patent and Trademark Office Employee.

Facsimile message from Chini Krishnan of Integris Security, Inc. to Professor Silvio Micali, dated Feb. 25, 1997, 12 pages including cover sheet, submitted in attached sealed envelope as Proprietary Material Not Open To Public To Be Opened Only By Examiner Or Other Authorized Patent And Trademark Office Employee..

International Search Report from PCT/US 96/17374, dated Feb. 19, 1997, 7 pages.

*Toward a national public key infrastructure,* IEEE Communications Magazine, Sep. 1994, vol. 32, No. 9, USSN 0163–6804, pp. 70–74.

*The Digital Distributed System Security Architecture,* Proceedings of the 12th National Computer Security Conference, 1989, pp. 305–319.

one page e–mail message from Dr. Micali to Integris dated Mar. 4, 1997, regarding references AR and AS.

two page e–mail message from Dr. Micali to Integris dated Mar. 4, 1997, mentioning references AR and AS.

one page reply e-mail message from Integris to Dr. Micali dated Mar. 5, 1997, confirming confidential status of references AR and AS.

Burr, William E. et al., "A Proposed Federal PKI Using X.509 V3 Certificates," Published on the World Wide Web.

Burr, W.E., "Public Key Infrastructure (PKI) Technical Specifications (Version 1): Part C—Concept of Operations," Published on the World Wide Web, Feb. 12, 1996, 30 pages.

Ford, Warwick, "Public-Key Infrastructure Standards," Published on the World Wide Web, Oct. 1996, 15 printed pages.

Elgamal et al., *Securing Communications on the Intranet and Over the Internet,* Netscape Communications Corporation, Jul. 1996.

*A Dictionary of Modern Legal Usage,* Oxford University Press 1987, p. 930.

Menezes A.J., *Handbook of Applied Cryptography,* 1996, pp. 566, 576–577, 588–589, 706, 716, 720, 728–729, 737 and 751.

B. Schneier, "Applied Cryptography"; (second edition, copyrighted 1996, publicly available Oct. 1995); John Wiley & Sons, New York; pp. 185–187.

FIG. 1

CERTIFICATE REVOCATION SYSTEM

CROSS-REFERENCE TO RELATED APPLICATION

This application is a continuation of application Ser. No. 08/559,533, filed Nov. 16, 1995, which is based on Provisional Application No. 60/006,038, filed on Oct. 24, 1995 now U.S. Pat. No. 5,666,416.

TECHNICAL FIELD

The present invention relates generally to secure communications and more particularly to schemes for certificate management.

BACKGROUND OF THE INVENTION

In many settings, it is necessary to certify certain data, as well as to revoke already issued certificates. For instance, in a Public-Key Infrastructure, (PKI) it is necessary to certify users' public keys.

In a digital signature scheme, each user U chooses a signing key $SK_U$ and a matching verification key, $PK_U$. User U uses $SK_U$ to compute easily his digital signature of a message m, $SIG_U(m)$, while anyone knowing that $PK_U$ is U's public key can verify that $SIG_U(m)$ is U's signature of m. Finding $SIG_U(m)$ without knowing $SK_U$ is practically impossible. On the other hand, knowledge of $PK_U$ does not give any practical advantage in computing $SK_U$. For this reason, it is in U's interest to keep $SK_U$ secret (so that only he can digitally sign for U) and to make $PK_U$ as public as possible (so that everyone dealing with U can verify U's digital signatures). At the same time, in a world with millions of users, it is essential in the smooth flow of business and communications to be certain that $PK_U$ really is the legitimate key of user U. To this end, users' public keys are "certified." At the same time it is also necessary to revoke some of the already-issued certificates.

CERTIFICATION AND REVOCATION OF PUBLIC KEYS. Typically, certificates for users' public keys are produced and revoked by certifying authorities called CA's.[1] A CA can be considered to be a trusted agent having an already certified (or universally known) public key. To certify that $PK_U$ is U's public key, a CA typically digitally signs $PK_U$ together with (e.g., concatenating it with) U's name, a certificate serial number, the current date (i.e., the certification or issue date), and an expiration date.[2] The CA's signature of $PK_U$ is then inserted in a Directory and/or given to U himself.

[1] A complete public-key infrastructure may involved other authorities (e.g., PCAs) who may also provide similar services (e.g., they may certify the public keys of their CA's). The present inventions can be easily applied to such other authorities.
[2] Before certifying U's public key, it is necessary to perform additional steps, such as properly identifying user U. The present invention, however, does not depend on these additional steps.

Upon receiving the (alleged) digital signature of user U of a message M, $SIG_U(M)$, a recipient R needs to obtain a certificate for $PK_U$. (Indeed, $SIG_U(M)$ may be a correct digital signature of M with respect to some public key $PK_U$, but R has no guarantee that $PK_U$ is indeed U's public key). Recipient R may obtain this certificate from the Directory, or from his own memory (if he has previously cached it), or from U himself. Having done this, R verifies (1) the correctness of the CA's certificate for $PK_U$ with respect to the CA's public key, and (2) the correctness of $SIG_U(M)$ with respect to $PK_U$. (If the CA's public key is not universally known, or cached with R, then a certificate for this key too must be obtained.)

Certificate retrieval is thus possible, although not necessarily cheap. Unfortunately, however, this is not the only retrieval that R needs to do. Indeed, it is crucially important that R makes sure that the certificate for $PK_U$ has not been revoked. This check, of course, may not be needed after the certificate's expiration date, but is needed during the certificate's alleged lifetime. A user's certificate can be revoked for a variety of reasons, including key compromise and the fact that the user is no longer associated with a particular CA.

To enable a recipient to establish whether a given certificate has been revoked, it is known that each CA periodically issues and gives the Directory a Certificate Revocation List (CRL for short), in general containing an indication of all the (not yet expired) certificates originally issued by it. A CRL typically consists of the issuer's digital signature of (1) a header comprising the issuer's name (as well as the type of his signature algorithm), the current date, the date of the last update, and the date of the next update, together with (2) a complete list of revoked certificates (whose date has not yet expired), each with its serial number and revocation date. Since it is expected that a CA revokes many of her certificates, a CRL is expected to be quite long.

After performing some checks on the CA's CRL (e.g., checking the CA's digital signature, checking that the CRL has arrived at the expected time, that a certificate declared revoked in the previous CRL of that CA—and not yet expired—still is revoked in the current CRL, etc.), the Directory stores it under its CA name.

When a user queries the Directory about the revocation of a certificate issued by a given CA, the Directory responds by sending to the user the latest CRL of that CA. The user can then check the CRL signature, the CRL dates (so as to receive a reasonable assurance that he is dealing with the latest one), and whether or not the certificate of interest to him belongs to it.

While CRLs are quite effective in helping users establishing which certificates are no longer deemed valid, they are also extremely expensive, because they tend to be very long and need to be transmitted very often.

The National Institute of Standard and Technology has tasked the MITRE Corporation to study the organization and cost of a PKI for the Federal Government. This study estimates that CRLs constitute by far the largest entry in the Federal PKI's cost list. According to MITRE's estimates/ assumptions, in the Federal PKI there are about three million users, each CA serves 30,000 users, 10% of the certificates are revoked,[3] CRLs are sent out bi-weekly, and, finally, the recipient of a digital signature requests certificate information 20% of the time.[4] The study envisages that each revoked certificate is specified in a CRL by means of about 9 bytes: 20 bits of serial number and 48 bits of revocation date. Thus, in the Federal PKI, each CRL is expected to comprise thousands of certificate serial numbers and their revocation dates; the header, however, has a fixed length, consisting of just 51 bytes.

[3] 5% because of key compromise and 5% because of change in affiliation with the organization connected to a given CA.
[4] The remaining 80% of the time he will be dealing with public keys in his cache.

At 2 cents per kilobyte, the impact of CRL transmission on the estimated yearly costs of running the Federal PKI is stunning: if each federal employee verifies 100 digital signatures per day on average, then the total PKI yearly costs are $10,848 Millions, of which 10,237 Millions are due to CRL transmission. If each employee is assumed to verify just 5 digital signatures a day on average, then the total PKI yearly costs are $732 Millions, of which 563 Millions are due to CRL transmission.

The MITRE study thus suggests that any effort should be made to find alternative and cheaper CRL designs. This is indeed the goal of the present invention.

BRIEF SUMMARY OF THE INVENTION

It is thus a primary object of the present invention to facilitate management of public key certificate revocation without providing users with lists of revoked certificates.

It is another primary object of the invention to provide certificate revocation information to users of a public key communications system wherein a user can receive an individual piece of information about any public key certificate instead of a large list of revoked certificates.

It is still another object of the invention to reduce dramatically the cost of managing public key certificates in part by reducing the size and number of transmissions by and among participants in the management scheme.

It is a still further object of the invention to provide novel certificate revocation schemes wherein a certifying authority can provide a positive and explicit statement about the validity status of each not-yet-expired certificate.

It is another object of the invention to allow certifying authorities to provide certificate validity information without requiring a trusted Directory.

It is a further object of the invention to provide a certificate management scheme wherein it is possible to prove that a given certificate was never issued or even existed.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which:

The FIGURE is a secure communications environment according to the invention including at least one user, one certifying authority and a directory wherein a certificate management scheme of the present invention is implemented.

DETAILED DESCRIPTION AND PREFERRED EMBODIMENT

Figure 1:
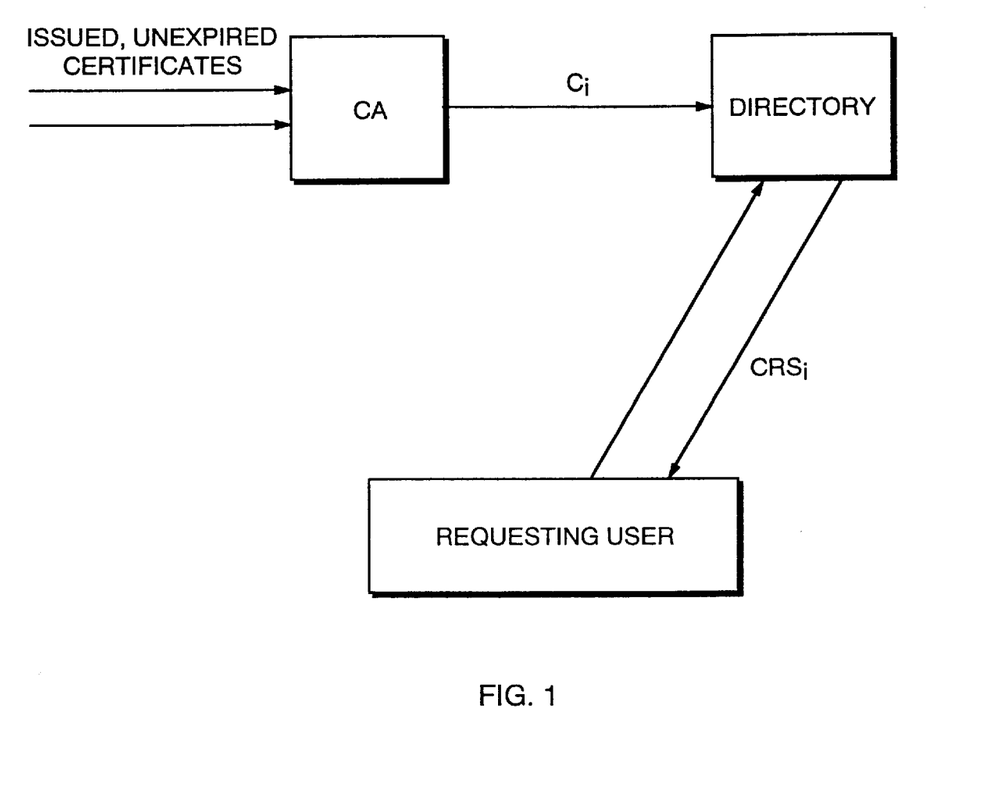

By way of brief background, assume that each user U of a digital signature scheme has a signing key $SK_U$ and a matching verification key, $PK_U$. User U uses $SK_U$ to compute easily his digital signature of a message m, $SIG_U(m)$, while anyone knowing that $PK_U$ is U's public key can verify that $SIG_U(m)$ is U's signature of m. $PK_U$ must be the legitimate key of user U, and thus it is known to certify users' public keys are certified. This process is now described.

Assume there are one or more certification authorities A, also known collectively as CA's. When U goes to A to have his public key $PK_U$ certified, she identifies him, makes sure that $PK_U$ is his public key, and then digitally signs the pair $(U, PK_U)$, indicating that $PK_U$ is U's legitimate public key. This signature, $SIG_A(U,PK_U)$, is verifiable by anyone, because A's public verification key, $PK_A$, is assumed to be universally known or otherwise, for instance, properly certified. The string $SIG_A(U,PK_U)$ constitutes a simple certificate for $PK_U$. Indeed, additional information can be included in $PK_U$'s certificate. The present invention, as will be seen, works for any type of certificate for PKU as well as whenever certificates concern objects other than users' public keys.

Such a certificate can be stored in a secure database or given to the user himself. Indeed, in order to enable a recipient of the signature $SIG_U(m)$ to verify it, U may also given the recipient $PK_U$ together with its certificate $SIG_A(U,PK_U)$. In this way, the recipient may first verify that $SIG_U(m)$ is a legitimate digital signature of m relative to the public key $PK_U$ (no matter to whom this key may belong), and then check that $PK_U$ is U's legitimate public key by verifying its certificate (i.e., by verifying A's digital signature SIG(U,PK) with the help of the well-known public key of A).

In the above system, U may be a buyer, the recipient a vendor, and m a payment for the purchase of a given good. The system is very convenient, but the possibility that public key certificates have been revoked must be addressed. If, for instance, U abuses of his digital signature power (e.g., he stops honoring the contracts or payments he signs), then his certificate $SIG_A(PK_U)$ must, somehow, be invalidated. This is the problem addressed by the present invention.

The preferred embodiment of the new certification/revocation system is now described. For simplicity of presentation, it is envisioned that a certificate revocation status is updated daily, although this is not a requirement of the present invention. According to the present invention, the CA has the responsibility of making and updating certificates. This is preferably accomplished in the following manner, although as will be seen other techniques may used as well.

As seen in the FIGURE, the certifying authority CA sends to the Directory individual certificate revocation status information $CRS_i$ about each of its issued, but not-yet expired certificates $C_1 \ldots C_k$. The Directory sends $CRS_i$ to a requesting user who has inquired about certificate serial number "i" of that certifying authority.

CA OPERATIONS (Making a Certificate.) A CA produces the certificate of a user's public key by digitally signing together traditional quantities (e.g., the user's public key, the user name, the certificate serial number, the type of signature algorithm of the issuer, the certification or issue date, and the expiration date) plus two new quantities: a (preferably 100-bit) value Y—for "YES"—and a (preferably 100-bit) value N—for "NO". These values are, at least with very high probability, unique to the certificate.

The CA preferably generates Y and N by selecting two secret preferably 100-bit values, respectively $Y_0$ and $N_0$, and then evaluating on them a given one-way function F 365 times (i.e., as many days in a year). Thus, $Y=Y_{365}=F^{365}(Y_0)$ and $N=N_{365}=F^{365}(N_0)$.

The CA may select $Y_0$ and $N_0$ at random (in which case she must separately store them) or pseudo-randomly (e.g., she computes them from a secret master key—which she keeps in storage—and other inputs such as the string YES—respectively, NO,—the certificate serial number, and the issue date) in which case she can recompute them when needed rather than storing them at all times.

(Updating the CRS.) Daily (but not by way of limitation), a CA sends the Directory the following information:

(a) Preferably, a digitally signed list of the serial numbers of all not-yet-expired certificates issued by her together with the current day;

(b) Preferably, the new certificates made that day; and (c) For each not-yet-expired certificate made by her, she sends a preferably 100-bit value computed as follows. Assume that the current day is the ith date in some standard reference (e.g., the ith day of the year, the ith date after the issue date of the certificate, and so on). Then, if the certificate was valid and continues to be valid, she sends the value $Y_{365-i}$ (which she may easily compute by evaluating F 365-i times on input $Y_0$). If the certificate ceases to be valid that very day, she sends the value $N_{364}$ (which she can easily compute starting with $N_0$). If the certificate was valid for the first j days after issuance, but has been invalid for the latest i-j-1 days, then preferably she sends the value $N_{365-(i-j)}$ (which she can also easily compute from $N_0$).

Note 1: Since there are one-way functions that are extremely easy to evaluate, updating a given CRS is very efficient, and at most 120 bits about it are preferably sent to the Directory; e.g., the certificate serial number (i.e., 20 bits) and a 100-bit (YES/NO) value. Alternatively, rather than sending a YES-value, a CA can sign the certificate's serial number together with the new date i and YES (if the certificate continues to be valid). Also, rather than sending a NO-value if the certificate is no longer valid, the CA can directly sign that the certificate has been revoked together with additional information (e.g., it may sign the certificate serial number together with the string NO and the revocation date, and/or additional information). In this case, such a revocation signature need not be sent at every subsequent CRS update.

Note 2: Handling the Y/N values can be done in several ways; for instance, but without limitation, by using just one or more values rather two YES- NO- values, or by using trap-door functions, etc. Also, rather than just a one-way function, a CA C may use a one-way hash function H. For instance, she may choose $Y_1=H(Y_0,C,1)$, $Y_2=H(Y_1,C,2)$, and so on. If desired, the hash function may have less or additional inputs, such as the issue date of the certificate.

Note 3: The amount of information sent by a CA to the Directory at each update is roughly twenty times as long as a CRL. Indeed, in a CRL update, the CA sends, on average, 9 bytes (72 bits) for 10% of the certificates. For a CRS update, the CA preferably sends 120 bits for each certificate in Step (c), and just 20 bits per certificate in Step (a). The number of bits transmitted in Step (b) is roughly the same for both systems.

Note 4: Calling the $Y_i$ and $N_j$ respectively YES- and NO-values, one may ensure that no YES-value coincides with a NO-value. In practice, however, this is unnecessary, because the probability of this happening if the function F is well-chosen is miniscule. (Indeed, for suitable choice of the parameters, it can be made much less than the probability that the digital signature algorithm of a CA is broken.)

DIRECTORY OPERATIONS (Response to CRS Update). For every CA, the Directory preferably stores all not-yet-expired certificates issued by her, organized by serial number, and for each of them it also stores its latest YES-value and NO-value (or the revocation signature as described above). The Directory preferably performs the following verification steps.

The Directory checks that each newly received certificate is well-formed and properly signed. (In particular, it checks that the certification/issue date coincides with the current day.)

The Directory checks that the latest list of not-yet-expired certificates of every CA is fine. (In particular, it checks that its date coincides with the current one, that the list is complete, and that no certificate declared invalid in the previous list is declared valid now.)

For every certificate, the Directory, upon receiving its latest 100-bit value V, performs the following check. Assume that the current day is i days after the certification date, and that the stored YES- and NO- values of the certificate are, respectively, Y' and N'.[5] Then, the Directory verifies whether F(V)=Y', if V is a YES value, and whether F(V)=N', otherwise.

[5]If all was done properly, these values should, according to our conventions, be $Y'=Y_{365-j}$ and $N'=N_{365-i-j-1}$ respectively.

(Response to Users' Inquiries.) Assume, for simplicity, that recipient users receive the certificates of their sending signers from the senders themselves. Thus, users make Directory queries just for determining the validity status of certificates already known to them.

When a user U inquires about the status of a given certificate (e.g., by specifying its CA and its serial number), the Directory retrieves and sends to U the latest YES-value and the latest NO-value of that certificate.

Should U inquire about a serial number that does not correspond to any not-yet-expired certificate issued by the CA, then the Directory sends U the latest, digitally signed, serial-number list of that CA or any other proof that the inquired-about certificate "does not exist."

Note 5: If a CRL-based system was adopted instead, when a query about a "non-existing" certificate is made, it is proposed herein that the Directory should provide U with a digital signature indicating that the certificate "does not exist."

Note 6: The Directory is not trusted very much, because it cannot "make valid" a revoked certificate, nor can it "make revoked" a valid one. Assume the i is the current date, and that a certificate has expired at some date $j \leq i$. Then, the CA has provided so far the Directory with at most j−1 F-inverses of $Y_{365}$, that is, with the Y-values $Y_{365}, \ldots, Y_{365-(j-1)}$. Thus, if the Directory wishes to make the certificate look valid at date i, it must invert F (at least once) on $Y_{365-(j-1)}$, which it cannot do because F is a one-way function[6]

Assume now that a certificate is valid at date i, and the Directory wishes to convince a user that it has been revoked at a date lesser than or equal to i. In order to do so, it must invert F at least once on the certificate's $N_{365}$ value, which again it cannot do because F is a one-way function.

[6]The CA does not know how to invert F in general. She only knows how to invert it on the $Y_i$, for i>0, because she chose $Y_0$ and $N_0$, and constructed the YES and NO values by evaluating F, on the easy direction, starting from $Y_0$ and $N_0$. Thus the CA can invert F on on $Y_{365}$ by either storing all intermediate Y-values, or quickly recomputing them from $Y_0$.

Assume now that the current date is i, and that the certificate ceased to be valid at date j<i, but the Directory wishes to convince a user that the certificate was actually revoked at a different date.[7] Notice that, at the current date k, the total number of "F-inversions" divulged by the CA for a certificate revoked at time j<i, is still j Y-values $(Y_{365}, \ldots, Y_{365-j})$ and i-j N-values (i.e., $N_{365}, \ldots, N_{365-(i-j)}$). If received at the current date i, this information specifies that the revocation date is j+1, that is, 1 plus the number of divulged Y-inversions. Indeed, if at current date i the Directory wished to pretend convincingly that the certificate was revoked at a date earlier than j, it should release at least one less Y-inverse and at least one more N-inverse, which it cannot do. Similarly, if at current date i the Directory wishes to fake that the certificate was revoked after date i, it should produce at least one more Y-inverse, which it cannot do either.[8]

[7]For instance, it may try to make trouble for someone who has accepted a signature relative to a public key that was valid at data d<j, by convincing someone else that the certificate of that public key was already revoked by date d.

[8]This information, however, does not prove the revocation date if examined at a later date, D>i. Indeed, the revocation date could be any date d between j and j+(D−i). Assume therefore that a malicious person has received at date D from the Directory $Y_{365-d}$ and $N_{365-(D-d)}$. Then, he may evaluate F on the received YES-value so as to obtain the jth inverse of $Y_{365}$, and may evaluate F on the received NO-value so as to compute the (i-j)th F-inverse of $N_{365}$. To prove what the revocation date is in a way that is verifiable at any point in time, see the discussion below.

For this reason it is not recommended that the CA signs the YES- and NO-values of every CRS update. Indeed, Y and N are signed within the certificate, and only the CA may easily invert F on them a few times. Thus any value V on which the one-way function F, evaluated at most 365 times, yields Y, must have been computed by the CA.

The latest YES or NO-values may however be digitally signed if desired.

USER OPERATIONS

Let Y and N be, respectively, the YES-value and the NO-value of the certificate the inquiring user U is interested in, and let the current date be i days after the certificate's issue date.

If the Director sends him Y' and N' (the alleged latest YES- and NO-value of the certificate), preferably then user U performs the following check. First he verifies that by evaluating F on Y' and N' he obtains, respectively, Y and N within a total of i F-evaluations. (As usual, we let $F^0$ denote the identity function.)

Then, letting a and b be the number of F-evaluations needed to obtain, respectively, Y from Y' and N from N', he verifies that a+b=i.

If the Directory claims that the certificate "does not exist" by sending him the CA's signed list of serial numbers of not-yet-expired certificates, or an alternative proof, then U checks the CA's digital signatures, and that the serial number of interest to him does not appear in the list or checks the alternative proof.

BENEFITS AND ANALYSIS

The novel system enjoys three main advantages over the traditional CRL. First, it saves dramatically on bit transmissions and costs. In this regard, recall that there are few CRS/CRL updates. Indeed, they typically occur bi-weekly and are performed by the CAs which are few in numbers. By contrast, there are very many queries of users to the Directory about certificate validity. Second, the inventive second always provides a positive and explicit statement about the validity status of each not-yet-expired certificate. By contrast, CRLs provided only indirect evidence; that is, the absence of a given serial number from a CRL was taken to mean that the corresponding certificate was still valid. Positive and explicit statements are much clear and advantageous from a legal point of view—e.g., from the point of view of liability—and preferable to "double negatives."

(add to claims) Moreover, the inventive scheme always allows a complete and satisfactory answer to any possible query of a user to the Directory and without trusting the latter in any special way. Again, by contrast, in a CRL-based system, if a user queries—by error, malice, or other reason—the Directory about a serial number S that does not belong to any not-yet-expired certificate issued by a given CA, the Directory cannot prove this to the user. Indeed, showing that the latest CRL of that CA does not comprise S is not such a proof. (It may actually be construed as proving that S's certificate is valid.) Even giving the user all not-yet-expired certificates issued by CA is not such a proof: the user may suspect that the Directory is purposely withholding the "right" certificate. Indeed, it is the CA to be basically trusted in the system, the Directory service is trusted to a much lesser extent.)

The transmission and cost savings of the CRS approach can now be seen. Assume, for concreteness, that a certificate, if not revoked, is valid for one year; that is, that the time interval between its issue date and its expiration date is one year. Since the savings of the CRS approach increase more than linearly with the total number of revoked certificates, and thus with the total number of certificates, let us assume that each user has only one certificate, and thus that each CA issues 30,000 certificates a year.[9]

[9]Presumably, instead, the typical user of a PKI will have multiple certificates, because he will use different signing keys for each of his different functions: private citizen, member of different organizations, sub-units, etc.

Then, since 10% of the issued certificates are revoked before their expiration date, we expect that each CRL comprises 3,000 (=10% of 30,000) items. Therefore, disregarding the 51-byte header, the expected length of a CRL is some 27,000 (3,000 times 9) bytes; that is, some 214,000 bits.

Though in some occasions these CRLs will be "pushed" by the CA's directly to their users (like in the emergency following to a major compromise of the system), they are ordinarily distributed in two modes: (1) biweekly from each of the about 100 CAs to the Directory, and (2) daily from some Directory agent to a requesting user. Of the two costs, the second is absolutely greater. Even making the assumption that each user verifies only 5 digital signatures a day on average (and that 20% of the time he experiences a cache miss and queries the Directory), on average there will be 3 Million daily CRL transmissions due to Mode 2, versus less than 40 (=100 CAs times 2 days/5 working days) daily transmissions due to Mode 1.

The inventive certification/revocation system replaces each CRL with a CRS which is roughly twenty times as long. Thus, Mode-1 costs jump from 40 CRL-transmissions per day to the equivalent of 800 CRL-transmissions per day. (Assuming that CRL are updated bi-weekly while CRS daily, Mode-1 costs would jump from 40 CRL-transmissions per day to the equivalent of 2,000 CRL-transmissions per day.) However, each of the 3,000,000 Mode-2 costs will decrease from transmitting one CRL (i.e., 214,000 bits plus a digital signature) to transmitting just 120 bits. Therefore, even assuming that CRS are updated daily, CRS are 1,000 times cheaper than CRLs.

FURTHER ADDITIONAL VARIATIONS AND MODIFICATIONS

It should be appreciated that several variations of the above technique are possible, all within the scope of the invention.

It should be realized that the functionality of the inventive certificate revocation system can be changed as to suit different needs. In particular the CA needs not to perform steps (a) or (b) during a CRS update (so as to focus only on the revocation aspects of the invention).

Moreover, the preferred embodiment uses a one-way function F and one YES- and one NO-value for the construction of a certificate. It should be realized the more than one one-way function can be used here. For instance, a one-way function F1 may be used for the YES-values, and a one-way function F2 for the NO-values. Alternatively, a one-way function $F_i$ may be used at level i, e.g., in the preferred embodiment, for computing $Y_{i+1}$ from $Y_i$. Also, the one-way function used may depend on the certificate serial number or other variable information. All these approaches are within the scope of the invention. Indeed, by one-way function we mean any process F that can on some legal input x easily generate a target y, while it is difficult given a target y to generate an input x mapped by the process to y. In fact, F may be the process of verification of a signature scheme and x a signature of y. (Indeed, we shall see that the preferred embodiment is a special type of digital signature.) For consistency, however, we shall continue using the traditional terminology of one-way functions assuming that only one of them is used.

In the preferred embodiment the CA may continue to provide F-inverses of the NO-value of a certificate that has been revoked so as to give some indication of the revocation date if desired. If determining the revocation date is not necessary (or is handled by a separate method, e.g., by presenting the CA's direct revocation signature including the revocation date or any other additional information), the CA may just provide the first F-inverse of N, and no other. (In this case, rather than setting $N=N_{365}=F^{365}(N_0)$, it may be more convenient choosing $N=N_1=F(N_0)$.) The Directory will thus store (and provide requesting users with) the latest YES-value as long as the certificate remains valid. When the certificate is revoked, the Directory may forget the latest YES-value and store instead the F-inverse of N (and/or the direct revocation signature of the CA), which will be provided to requesting users as a proof of the revocation of the certificate. Notice that still the Directory is not trusted very much. Indeed, when requested at date i about the status of a given certificate, it must respond either with the ith F-inverse of Y, or with one inverse of N. This specific variation, however, while proving that a certificate has been revoked, does not prove at all when it has been revoked.

However, one may dismiss the NO-values altogether, and yet prove the revocation date. For instance, a certificate may just have one 100-bit value $Y=Y_{365}$. If the certificate remains valid at date i, then the CA forwards the Directory the ith F-inverse of Y. Else, the CA forwards a digital signature indicating that the certificate has been revoked, preferably also indicating additional data, such as the revocation date. This direct signature may be stored by the Directory (so that the CA may no longer send anything else about a revoked certificate if desired) and provided to requesting users as a proof of revocation. Such a direct signing step may require more computation and may require more bits to transmit, but it is conceptually simpler and provides a fixed and universally verifiable proof of revocation that is good at any date.

It should be appreciated that the information sent by the CA in step (a) of a certificate update should be construed as any information that enable one to verify whenever a given serial number corresponds to some (issued an not-yet-expired) certificate. For instance, since there are 20 bits devoted to serial number information in the above example, and thus $2^{20}$ (roughly a million) possible certificates issued per CA, a CA may just digitally sign a $2^{20}$-bit string, where bit number i is 1 if there is a (not-yet-expired) certificate issued by the CA whose serial number is i, and 0 otherwise.

It should also be recognized that the inventive system applies to the certification of arbitrary pieces of data, and not just public verification keys. Indeed, the invention provides a system for enabling a signer to prolong the validity of any digital signature created by the signer. In particular, in other contexts, the signer may extend the validity of her signature without any Directory as an intermediate entity; indeed, she can prolong the validity of a given signature by sending the proper information directly to a recipient.

It should be appreciated that in the above embodiment a particular off-line scheme is used for signing, but that other off-line schemes can be used within the scope of the invention. In a known off-line signature scheme, as exemplified in U.S. Pat. No. 5,016,274, a signer makes use of two digital signature schemes: a first (traditional) scheme having PK as the public verification key and SK as the relative secret key, and a second scheme (which is preferably one-time) and has public-verification key pk and secret verification key sk. The signer, in an off-line step, uses the first scheme (and thus SK) to produce a digital signature, $\Sigma$, of the public key pk, possibly with other data. In a subsequent step, the signer may (via sk) produce the digital signature, $\sigma$, of a message with respect to pk using the second digital signature scheme.

Such a compound signature scheme can be useful because the second component scheme may be suitably restricted and/or particularly fast. For instance, the second scheme may be one-time or capable of signing only certain messages and not others. Because of these restrictions, however, the second scheme can be very fast or require very compact signatures. Speed, in general, is not an adequate compensation for these limitations. However, these limitations can be overcome by continually changing the matching public and secret keys (pk and sk) for the second scheme and authenticating the so-chosen public keys by digitally signing them by means of a first and fixed (or at least less-variable) traditional signature scheme. Although this first scheme could be slower than the second scheme, it is used to sign pk in an off-line step where performance, among other things, is less crucial.

Referring back to the present invention, assume for simplicity that the preferred embodiment is implemented with a single additional certification value $Y_{365}$ (and that a CA directly signs that a certificate has been revoked when this becomes the case). Then, $Y_{365}$ can be considered the public key of a constrained signature scheme whose secret key is $Y_0$. Indeed, the CA signs $Y_{365}$ in a off-line step (when making a certificate) together with additional data (the full certificate itself). In a subsequent step (i.e., during CRS update i) the CA uses the secret one-time key $Y_0$ in order to sign a constrained class of messages; that is, a value i between 1 and 365, to signify that the certificate is valid up to date i.

Notice that in this constrained scheme, given a signature for i, anyone can compute a signature for j<i, but this is not a real forgery because any certificate valid up to date i is certainly valid up to date j (and indeed the value j was signed before signing i). Different one-time signature schemes could be used, in particular, to prevent someone who has not seen a previously signed message from re-signing it.

The preferred embodiment may implement CRS with any first and second signature scheme within the scope of the invention and with more than one public keys for each scheme if desired. Again, other second signature schemes can be used to conveniently digitally sign arbitrary dates (and not just any date between 1 and 365) and the revocation date for revoked certificates (rather than having the CA directly sign such revocation date within a revocation signature).

As for any off-line scheme, in this application there may be a single signer for both the first and the second digital signature scheme as well as different signers for the two schemes. Indeed, the CA (or any first entity) may generate both the public and secret keys PK, SK, pk and sk, and then give sk to a second entity (e.g., the Directory), alternatively, the second entity may come up with pk and sk, and ask the first entity to sign pk. Either way, the first entity can retain the power of making a certificate, while empowering the second entity to extend the validity of the certificate. By giving proper one-time secret signing keys, the CA may limit the power of the second entity in an arbitrary way by enabling it to sign certain messages and not others. For instance, it may limit the second entity to sign values between 1 and 365 only.

Generalizing, the above-described off-line scheme may be construed as one in which a first entity digitally signs, using a first digital signature scheme, the public key of a second digital second signature scheme whose secret key is known to a second entity, where the second digital signature scheme is restricted so as to be able to sign certain predetermined messages, and not others, to thereby enable the second entity to sign solely predetermined messages. In the above examples, the predetermined messages are the values 1 through 365. Thus, only the CA can generate a new certificate, but he may leave to the Directory the power of lengthening the validity of the certificates she creates on a daily basis for, for example, a maximum of a year. This technique is most useful when the second entity is not totally trusted at least by the first entity and therefore the messages it can sign are restricted in a way comfortable to the first entity. It can also be arranged that only the second entity is responsible for the messages it authenticates relative to pk; alternatively, because the first entity has signed pk (and because the second entity can only sign certain predetermined messages relative to pk) the first entity takes responsibility for the messages signed by the second entity relative to pk. This scheme is very useful if the first entity desires to be represented by many agents (e.g., many second entities) and thus be relieved of the burden of signing certain predetermined messages, e.g., over some period of time or due to some contingency.

The foregoing has outlined some of the more pertinent objects and details of a preferred embodiment of the present invention. These objects and details should be construed to be merely illustrative of some of the more prominent features and applications of the invention. Many other beneficial results can be attained by applying the disclosed invention in a different manner or modifying the invention as will be described. Those skilled in the art will recognize that the invention can be practiced, with modification, in other and different certification methods and schemes within the spirit and scope of the invention.

Those of ordinary skill in the art will appreciate that any of the Users, CA and the Directory may be or have associated therewith a computer or workstation with suitable processing and storage capability to carry out the steps of the inventive methods. Each such computer or workstation has a suitable processor, known input/output devices and control programs. One of the preferred implementations of the various routines disclosed above is as a set of instructions in a code module resident in the random access memory of a computer or workstation. Until required by the computer, the set of instructions may be stored in another computer memory, for example, in a hard disk drive, or in a removable memory such as an optical disk (for eventual use in a CD ROM) or floppy disk (for eventual use in a floppy disk drive). In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Of course, digital signatures schemes and digital signatures should be construed broadly here so as to incorporate any form of digital authentication or commitment. Actually, some of these authentication's need not be digital if desired. For instance, the CA could use pen-written signatures when making a certificate, and rely on digital authentication/commitment (e.g., the YES-value mechanism) for extending the certificate validity.

As used herein, it should be appreciated that a "user," a "certifying authority" and/or a "directory" may be a computer, a person or entity operating a computer or other workstation, or a multiplicity of such persons or entities. Also, "certificate" should be broadly construed as the digital signature of a given piece of data. A certifying authority should be broadly construed as the signer of this piece of data. The problem of "revoking a certificate" should be broadly construed as well, as taking away or invalidating the validity of or commitment to the signature. In contrast, the inventive methods should likewise be construed to provide the advantage of lengthening or extending the validity of a signature, even after a prescribed expiration date. A user should be construed to include any entity that is interested in verifying whether a given certificate is valid at a certain date. A directory should be construed like any entity that may assist certifying authorities and users in the above tasks.

Having now described my invention with respect to the preferred embodiments, the following is what I now claim.

What is claimed is:

1. A method of generating a certificate for data, comprising the steps of:
    (a) generating a final value by iterating a one-way function on a secret first value;
    (b) generating certificate information that includes the data and the final value; and
    (c) generating the certificate by digitally signing the certificate information.

2. A method according to claim 1, wherein the data includes a public key of a public-key cryptosystem.

3. A method according to claim 1, wherein a first entity generates the final value and a second entity digitally signs the certificate information.

4. A method according to claim 3, wherein the second entity is a CA.

5. A method according to claim 1, wherein the one-way function is a hash function.

6. A method according to claim 1, further comprising the step of:
    (d) providing at least one additional value as an input to at least one iteration of the one-way function.

7. A method according to claim 1, further comprising the step of:
    (d) providing at least one additional value as an input to every iteration of the one-way function.

8. A method of proving that previously certified information is valid at each date in a sequence of dates, comprising the steps of:

(a) at each of the sequence of dates, determining whether the previously certified information is valid; and (b) if the certified information is valid at a date within the sequence of dates, producing a string unique to the certified information authenticating that the previously certified information is valid at the date.

9. A method according to claim 8, wherein the string is a digital signature.

10. A method according to claim 9, wherein the digital signature is off-line.

11. A method according to claim 9, wherein a certifying authority produces the digital signature.

12. A method of authenticating that each member of a subset of certifies that bind given keys to given users is valid at a given date, comprisign the steps of:

(a) determining each of the members of the subset that are valid at a given date specific to the member; and (b) for each member of the subset that is determined to be valid, authenticating that the member is valid at the given date by producing a string unique to the member.

13. A method according to claim 12, wherein the string is a digital signature.

14. A method according to claim 13, wherein the digital signature is off-line.

15. A method according to claim 13, wherein a certifying authority produces the digital signature.

* * * * *